United States Patent [19]

Arndt et al.

[11] Patent Number: 4,689,254

[45] Date of Patent: Aug. 25, 1987

[54] MAGNETIC RECORDING ELEMENT HAVING A LUBRICATIVE AND PROTECTIVE COATING

[75] Inventors: John L. Arndt, San Jose; Karlson Koo, San Mateo, both of Calif.

[73] Assignee: Verbatim Corporation, Sunnyvale, Calif.

[21] Appl. No.: 761,301

[22] Filed: Jul. 29, 1985

Related U.S. Application Data

[63] Continuation of Ser. No. 576,134, Feb. 1, 1984, abandoned.

[51] Int. Cl.$^4$ .......................... B32B 3/02; G11B 5/72; G11B 5/82
[52] U.S. Cl. .................................. 428/65; 427/127; 427/130; 427/189; 427/195; 427/365; 428/336; 428/421; 428/422; 428/694; 428/695; 428/900
[58] Field of Search ............... 428/421, 422, 694, 695, 428/900, 65, 336; 427/127, 189, 195, 365, 130

[56] References Cited

U.S. PATENT DOCUMENTS

| | | | |
|---|---|---|---|
| 3,490,946 | 12/1966 | Wolff | 117/235 |
| 3,998,989 | 12/1976 | Pardee et al. | 428/409 |
| 4,128,673 | 12/1978 | Watanabe et al. | 427/130 |
| 4,188,434 | 2/1980 | Loran | 428/65 |
| 4,232,072 | 11/1980 | Pardee | 428/65 |
| 4,267,238 | 5/1981 | Chernega | 428/695 |
| 4,268,556 | 5/1981 | Pedrotty | 428/695 |
| 4,390,562 | 6/1983 | Yanagisawa | 427/11 |
| 4,419,404 | 12/1983 | Arai et al. | 428/695 |
| 4,499,121 | 2/1985 | Yamaguchi et al. | 427/128 |
| 4,526,833 | 7/1985 | Bargnette et al. | 427/131 |

FOREIGN PATENT DOCUMENTS

| | | |
|---|---|---|
| 087229 | 7/1981 | Japan . |
| 56-159835 | 12/1981 | Japan . |
| 56-159840 | 12/1981 | Japan . |
| 150137 | 9/1982 | Japan . |
| 58-94130 | 6/1983 | Japan . |

OTHER PUBLICATIONS

IBM Technical Disclosure Bulletin; vol. 24, no. 11A, Apr. 1982, pp. 5477.

*Primary Examiner*—George F. Lesmes
*Assistant Examiner*—William M. Atkinson
*Attorney, Agent, or Firm*—Alfred P. Lorenzo

[57] ABSTRACT

A magnetic recording element comprised of a substrate having a magnetic recording layer disposed thereon is provided with a smooth uniform transparent lubricative and protective coating. The coating, which is composed of a telomer of tetrafluoroethylene, overlies the magnetic recording layer and also extends deeply into the topographical irregularities thereof so as to be strongly bonded thereto. To form the coating, a dispersion composed of particles of a telomer of tetrafluoroethylene dispersed in a liquid medium is applied to the surface of the magnetic recording layer, the liquid medium is removed to leave the telomer on the surface in the form of an opaque particulate film, and the particulate film is compacted, such as by use of buffing and calendering steps, to force telomer particles into the magnetic recording lever and to form a smooth uniform continuous layer of telomer over the surface of the magnetic recording layer. The coating is particularly useful as a lubricative and protective coating for high density floppy disks.

23 Claims, 4 Drawing Figures

U.S. Patent  Aug. 25, 1987  4,689,254
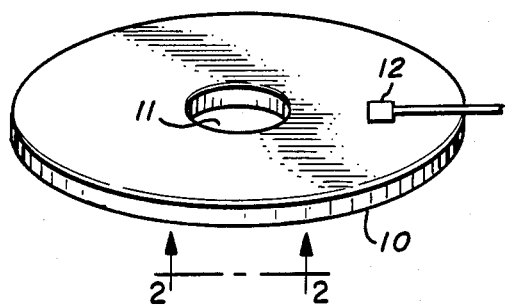
Fig_1
PRIOR ART
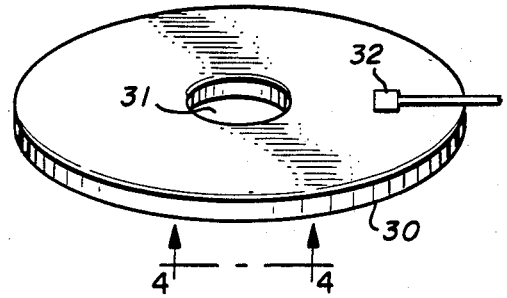
Fig_3
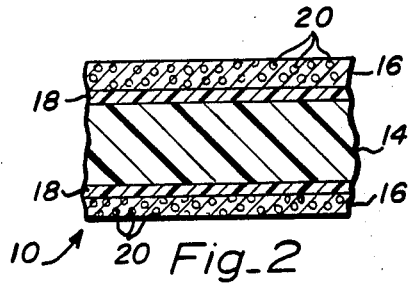
Fig_2
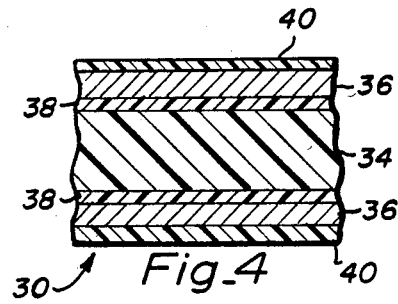
Fig_4

MAGNETIC RECORDING ELEMENT HAVING A LUBRICATIVE AND PROTECTIVE COATING

This is a continuation of co-pending application Ser. No. 576,134 filed on Feb. 1, 1984, now abandoned.

BACKGROUND OF THE INVENTION

1. Field of the Invention

This invention relates generally to an improved one-component lubricative and protective coating for a magnetic recording medium, and more particularly to a fingerprint and moisture resistant lubricant and coating for a floppy disk.

2. Description of the Prior Art

There is a rapidly growing demand for more effective types of storage media for microcomputers. Various devices and methods have been created to handle the storage of large quantities of information. Typically, information is stored on disk storage media, either a hard Winchester disk or a soft floppy disk. Floppy disks are slower than the hard disks and generally less reliable. Floppies also have more limited storage; currently in the range of 160-640 kilobytes. Floppies are also much less expensive than hard disks, but due to their construction and mode of use are very prone to wear and contamination from the environment, for example from fingerprints and coffee spills. Floppy disks also tend to deform under humidity and temperature changes causing the disk to swell or shrink which shifts the narrow tracks. Such environmental contamination and hygroscopic effects can result in serious consequences on the readability of the disk. As disk manufacturers look to higher bit densities to increase storage space, it becomes more critical to protect the disk from contamination and to ensure correct head tracking. Additionally, the disks are interfaced by a read/write head which contacts the disk when the disk starts and stops its high speed rotation. Thus the disk may have a lubricant layer to reduce the frictional engagement therewith. Any lubricant coating on a magnetic recording medium must, however, be firmly bonded to the medium to prevent its accumulation on the head. The magnetic recording medium itself, consisting of minute particles of an oxide of iron or other metal, is highly abrasive to the head, and will rapidly degrade the head if it is not protected. Typically liquid lubricants are employed, but these require binders to maintain them in adherence to the medium. Despite the binders, the relatively high vapor pressures of many lubricants precludes their effectiveness over protracted periods. Solid lubricants have had only limited success, primarily because their inherent lack of flowability requires thick layers, increasing the gap spacing and thus decreasing magnetic impulse transfer between the head and the medium.

Floppy disks are typically constructed of a polyethylene terephthalate (PET) film known by the trade name Mylar, or a similar material, coated with a magnetic medium on which information may be stored and from which information may be retrieved. The magnetic medium, is a ferromagnetic recording medium and typically is a ferric oxide coating. This medium itself is sensitive to abrasion and environmental damage and to ensure its longevity it must be protected. This is accomplished in part by enclosing the disk in a jacket. The disk however is also susceptible to damage in use from pressure exerted by the read/write heads and by human handling. Accordingly it is advantageous to provide the disk itself with a protective coating. Typically the lubricant applied to the surface of the disk may have some protective qualities but such lubricants are primarily intended to reduce the frictional engagement of the read/write head with the surface of the disk, and are not protective in function.

Typical prior art approaches to coatings for magnetic recording media involve a liquid lubricant, applied to the surface of the medium. U.S. Pat. No. 3,490,946 issued to Wolff, discloses a fluorocarbon polymer dispersed in a relatively non-volatile fluorocarbon carrier. Wolff is intended and acts as a lubricant coating, and does not disclose any protective effects. Wolff also requires a binder in application of the lubricant, as the lubricant is a liquid. U.S. Pat. No. 4,188,434 issued to Loran utilizes a liquid lubricant, although a solid lubricant is also included. Other references, for example U.S. Pat. No. 3,998,989 issued to Pardee disclose similar combinations of lubricating agents i.e. solid-liquid or liquid-liquid mixtures. The Pardee patent, as well as a second Pardee U.S. Pat. No. 4,232,072 are designed primarily for substrates other than magnetic recording media, such as photographic film and thermoplastic materials including phonograph records.

U.S. Pat. Nos. 4,390,562 issued to Yanagisawa and 4,330,150 issued to Dorrell relate to lubrication of metal surfaces and not to magnetic recording media. Other approaches include that of Schoettle et al (U.S. Pat. No. 4,254,585) which describes a burnishing, cleaning and calendaring process without the use of a coating for treating magnetic media, and Yamada (U.S. Pat. No. 4,391,851) which is a means of producing a high density magnetic coating on a tape.

In view of the prior art, the problem of providing an effective protective coating for flexible magnetic storage media still exists. None of the prior art disclose a coating which is resistant to environmental contaminants and which does not interfere with disk readability.

SUMMARY OF THE INVENTION

Accordingly, it is an object of the present invention to produce a protective coating which lubricates and protects the disk surface.

It is a further object of the present invention to provide a physical seal to reduce or prevent lubricant migration off the magnetic layer.

It is an additional object of the present invention to provide a protective coating which prevents hygroscopic effects upon the substrate's dimensions.

It is an additional object of the present invention to make the disk resistant to hazards of the office environment, such as coffee and soda spills, water, ash and fingerprints.

It is another object of the present invention to provide a coating which eliminates the need for a burnishing step.

Briefly, a preferred embodiment of the present invention includes a floppy disk coated with a formulation of a tetrafluoroethylene telomer, e.g. one known by the trade name Vydax, which has been buffed and calendered. A process for producing the coated disk includes applying a dispersion of the tetrafluoroethylene telomer in a carrier of trichlorotrifluoroethane, e.g. one known by the trade name Freon TF. This dispersion is sprayed or dipped onto the disk. The carrier rapidly evaporates, leaving the telomer on the magnetic layer as an opaque particulate film. This coating is then buffed with a fibrous wipe which both removes excess particles and acts to force these particles into the magnetic recording surface. After buffing the coating is calendered to decrease the spacing thickness and to further force the particles into the magnetic layer. This additionally acts to physically bond the telomer to the magnetic layer.

It is an advantage of the present invention that the frictional engagement of the recording head with the disk is reduced.

It is a further advantage of the present invention that the disk surface is sealed from the deleterious effects of environmental hazards such as fingerprints and food stains.

It is a further advantage that the present invention acts as a physical seal to reduce or prevent lubricant migration from the magnetic layer.

It is yet another advantage of the present invention that the substrate is sealed from the hygroscopic moisture effects thereby reducing disk expansion and contraction.

It is another advantage of the present invention that the invention may eliminate the need for a hub ring on a floppy disk.

It is another advantage of the present invention that the need for burnishing of the magnetic layer is eliminated.

These and other objects and advantages of the present invention will no doubt become apparent to those skilled in the art after having read the following detailed description of the preferred embodiment which is illustrated in the various drawing figures.

IN THE DRAWING

FIG. 1 illustrates a perspective view of a flexible magnetic recording disk of the prior art;

FIG. 2 is a cross-sectional view of a portion of the disk of FIG. 1, taken along line 2—2 of FIG. 1;

FIG. 3 is a perspective view of a flexible magnetic recording disk of the present invention; and FIG. 4 is a cross-sectional view of a portion of the disk of FIG. 3, taken along line 4—4 of FIG. 3.

DETAILED DESCRIPTION OF THE PREFERRED EMBODIMENT

FIG. 1 illustrates a perspective view of a floppy disk of the prior art, referred to by the general reference character 10, and including a central mounting aperture 11. Also shown schematically is a read/write head 12, in position over the disk 10. FIG. 2 illustrates a cross-sectional view of the disk 10, taken along line 2—2 of FIG. 1. The disk 10 includes a substrate layer 14, to which is bonded a pair of magnetic recording layers 16 by a binder system 18. The magnetic layers 16 are very susceptible to degradation from wear, and thus may also contain an additive 20 which may include dispersants, lubricants and antistatic agents.

FIG. 3 illustrates a perspective view of a floppy disk of the present invention and referred to by the general reference character 30. The disk 30 includes a mounting aperture 31 and is illustrated with a read/write head 32 schematically shown in position above the disk 30. FIG. 4 illustrates a cross-section of a portion of the disk 30, taken along line 4—4 of FIG. 3. The disk 30 includes a PET substrate layer 34 to which is bonded a pair of magnetic recording layers 36 by a binder system 38. Impacted into each magnetic recording layer 36 is a protective coating 40. If the disks are manufactured with only one side certified for use, the coating 40 may be omitted from the uncertified side. The coating 40 comprises a dispersion of particles of tetrafluoroethylene which are in a solid form and average about five microns in size. Typically, the PET substrate layer 34 is about three mils thick and the magnetic recording layer 36 is about one hundred microinches thick. The coating 40 is layered atop the magnetic recording layer 36 to a depth of about one to three microinches.

A process for making the magnetic storage medium of the present invention is as follows. The substrate 34 comprising a polyethylene terephthalate or similar material is formed into the desired dimensions as known in the art. The magnetic recording layer 36 is deposited onto the substrate 34 also by any method utilized in the art. This magnetic layer 36 is bonded to the substrate 34 by the binder 38 as previously noted. A number of binders and magnetic particles are known, and may be utilized with the present invention. Such binders include urethanes, phenoxy compounds, vinyls, nitrocellulose compounds, epoxys and acrylics. Examples of magnetic materials include the iron oxides, chromium dioxides and ferrites. This magnetic recording layer 36 comprises, on a microscopic level, a plurality of magnetic particles whose orientation is random within the binder system 38. These particles may be needle shaped, however the future trend is toward isotropic, orthorhombic and other non needle-shaped particles in high bit density applications. These particles comprising the magnetic recording layer 36 possess magnetic domains, which are randomly oriented in the absence of a magnetic field. When a field is applied by the read/write head 32 the magnetic domains become oriented parallel to the lines of force of the applied field, thus storing a bit of data. Any coating to be applied onto the recording layer 36 must, accordingly, not be so thick as to interfere with the dynamics of the read/write head 32. Too thick of a lubricant coating will increase the head gap spacing and result in poor readability of the magnetic layer 36. Solid coatings have been employed as lubricants in the prior art, but have had limited success because they tend to increase the head gap spacing too much. Additionally, there may be surface irregularities in the height of the magnetic layer 36, caused by minor variations in the substrate 34 or by irregularities in the application of the magnetic medium 36.

These variations have created problems for lubricant coatings in the art as they must be sufficiently flowable to compensate for these topographical irregularities in order to result in a uniform surface. Prior art approaches to solving this problem utilize a flowable liquid coating which distributes itself into the topographical variations. Such a liquid coating however has limited protective qualities, and usually needs to be formulated in conjunction with a binder.

The coating 40 of the present invention is a suspension of a solid telomer of tetrafluoroethylene in a halogenated hydrocarbon carrier, and is applied as a surface coating to the magnetic recording medium 36 of the substrate 34 of the floppy disk 30 or other flexible magnetic medium such as a magnetic tape. This application may take the form of spraying, dipping, brushing, doctoring or ay other means of application known in the art. The preferred formulation of the telomer and hydrocarbon carrier is a product manufactured by the Miller Stephanson Chemical Co., Inc. and carrying the product designation MS122 or MS143. These products contain a waxy, short chain telomer of tetrafluoroethylene, having an average molecular weight of approximately 3700, known under the trade name Vydax. The preferred form of halogenated hydrocarbon carrier used to suspend the Vydax is a fluorinated hydrocarbon, specifically Freon TF. The Freon TF carrier is highly volatile, thus it evaporates rapidly from the surface of the disk 30, leaving behind a layer of pure telomer. This results in an opaque particulate film on the magnetic layer. At this point the telomer layer is too thick and non-uniform to allow the disk 30 to be utilized. To remove excess telomer, the coating 40 is buffed, using a fibrous wipe. The buffing acts to remove excess telomer particles from the surface of the magnetic recording layer 36, and further acts to force these particles, which are cold flowable, into the topographical irregularities of the recording layer 36. The resulting coating is highly lusterous and transparent and exhibits the desired resistance to fingerprints and environmental contaminants. After buffing, the surface coating 40 must be further reduced in thickness for use in recording data magnetically. To further decrease the spacing thickness of the coating 40, the substrate 34, recording layer 36 and coating 40 are calendered. The apparatus used in the calendering operation is a drum type pressure calender without heat, although heat may be employed when it is desirable to alter the characteristics of the coating 40 and/or the magnetic layers 36. For example, when a urethane binder is used, heat is unnecessary. An acrylate binder however, is much harder and may require heat to improve its and the telomer's flow characteristics. The calender pressure may range from ten, and more specifically from at least about one hundred fifty, pounds per linear inch (PLI) to fifteen hundred PLI depending on the type of substrate 34 and binder 38. The calender pressure may be varied to optimize telomer thickness and associated recording performance. The calendering is performed as known in the art, and may be done prior to the buffing step but the preferred method is to buff first and then calender. The calendering compacts the recording layer 36 as well as impacting and impinging the cold-flowable telomer coating 40 into the magnetic recording layer 36. This acts to physically bond the telomer particles to the recording layer 36 and results in a thin, uniform and stable coating 40 comprising a telomer layer on the magnetic recording layer 36. The calendering step, in addition to smoothing out irregularities in the magnetic recording layer 36, also compensates for the variations in chain-length of the various telomers of tetrafluoroethylene comprising the Vydax product. A uniform coating is achieved by mechanically forcing the telomer particles into the magnetic recording layer 36 to a uniform distance. This eliminates the need to homogenize the particles prior to application, for example by filtration.

The resultant disk 30 is fingerprint resistant due to the slickness of the coating 40, and, due to the telomer coating 40's low critical surface tension, the disk 30 is resistant to any aqueous solution such as coffee, water, soda, etc. The coating 40 may be applied to both the upper and lower magnetic recording layers 36 of the disk 30. This effectively seals the disk 30 from hygroscopic effects, and the dimensional fluxes associated therewith.

The invention additionally eliminates the need for a burnishing step in the manufacture of the floppy disks. Burnishing of the magnetic layer is done to eliminate loose oxides, which can cause dropouts, and to decrease spacing gap disparities. Because the coating 40 and process for applying it contains the magnetic layer and maintains uniform spacing gaps, the burnishing step can be eliminated. Because of the abrasion resistance of the coating 40, off-center clamping of the disk 30 will not result in a hub ring makr. Thus, the need for a hub ring is eliminated.

The following specific example of the invention will serve to further illustrate details of the present invention.

EXAMPLE I

Three groups of Verbatim ® Datalife TM five and one-quarter inch single density floppy disks were obtained prior to burnishing and were sprayed on both sides with a suspension of Vydax AR (a short chain telomer of tetrafluoroethylene) in Freon TF (trichlorotrifluoroethane) solvent. The disks were sprayed until a uniform, slightly opaque layer was evident on the disk surfaces. The weight of the applied coating was determined to be approximately thirteen milligrams per side of the disks. The disks were then vigorously hand buffed with lint free wipe material, resulting in a high gloss transparent coating on the disk surfaces. The weight of the telomer material remaining on the disk surface was found to be approximately four milligrams per side of the disks. Each group of disks were then subject to a specific pressure in a steel roll/compliant roll calender at ambient temperature (21° C.).

| GROUP | CALENDER PRESSURE-POUNDS PER LINEAR INCH |
|---|---|
| A | 300 pli |
| B | 500 pli |
| C | 670 pli |

Uncoated samples were calendered in each group. All of the disks were measured for signal playback amplitude, resolution and modulation, dropout levels, pad loaded and rotational torque, and durability. The disks were also checked for fingerprint, coffee, soda, water, cigarette ash, and dirt resistance. These results were compared to untreated Datalife TM five and one-quarter inch single density floppy disks.

Signal playback amplitude, resolution and modulation were not significantly different from the values of the untreated disks, and dropout levels of the surface coated and calendered disks were not significantly different from the untreated Datalife TM disks. Durability, pad loaded and rotational torque were within the specification for untreated Datalife TM disks.

The surface coated and calendered disks were also subjected to coffee, soda and water contamination, and were found to be non-wettable. The aqueous contamination was easily removed by shaking the disks, and by the disk jacket liner material. The surface coated and calendered disks were further contaminated by cigarette ashes and dirt. This was also easily removed by shaking the disk and by the wiping action of the disk jacket liner material. Fingerprints that were applied to the disk were removed within several disk revolutions by the disk liner jacket material, or could be wiped off by a lint-free wipe material without affecting the disk performance.

An additional benefit of the coating as applied was the reduction or elimination of disk drive clamp marks upon the treated disk near the disk hub.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly it is intended that the appended claims be interpreted as covering all alterations and modifications as fall within the true spirit and scope of the invention.

What is claimed is:

1. A floppy disk comprising:
   a polyethylene terephthalate substrate;
   a magnetic recording layer comprising ferric oxide dispersed in a binder disposed on said substrate; and
   a smooth uniform transparent lubricative and protective coating which overlies said magnetic recording layer and extends into the topographical irregularities thereof, said coating having been formed by a process comprising the steps of:
   applying to said magnetic recording layer a coating of a dispersion which consists of particles of a telomer of tetrafluoroethylene dispersed in trichlorotrifluoroethane,
   permitting said trichlorotrifluoroethane to evaporate from said coating to thereby leave said telomer on the surface of said magnetic recording layer in the form of an opaque particulate film;
   buffing said opaque particulate film to effect removal of excess telomer particles and to force telomer particles into said magnetic recording layer; and
   calendering said floppy disk at a pressure of at least about 150 pounds per linear inch to compress said magnetic recording layer and to further force telomer particles into said magnetic recording layer so as to form a smooth uniform transparent lubricative and protective coating consisting of said telomer which overlies said magnetic recording layer and extends into the topographical irregularities thereof to an extent sufficient to render it durable, abrasion-resistant and long-wearing.

2. A floppy disk as claimed in claim 1 comprising a magnetic recording layer disposed on each side of said substrate and a lubricative and protective coating overlying each of said magnetic recording layers.

3. A flexible magnetic recording element comprising:
   a flexible substrate;
   a magnetic recording layer disposed on said substrate, said magnetic recording layer comprising magnetic particles dispersed in a polymeric binder; and
   a smooth uniform transparent lubricative and protective coating which overlies said magnetic recording layer and extends into the topographical irregularities thereof, said coating having been formed by a process comprising the steps of:
   applying to said magnetic recording layer a coating of a dispersion which consists of particles of a telomer of tetrafluoroethylene dispersed in a liquid medium;
   effecting removal of said liquid medium from said coating to thereby leave said telomer on the surface of said magnetic recording layer in the form of an opaque particulate film;
   buffing said opaque particulate film to effect removal of excess telomer particles and to force telomer particles into said magnetic recording layer; and
   calendering said element at a pressure of at least about 150 pounds per linear inch to compress said magnetic recording layer and to further force telomer particles into said magnetic recording layer so as to form a smooth uniform transparent lubricative and protective coating consisting of said telomer which overlies said magnetic recording layer and extends into the topographical irregularities thereof to an extent sufficient to render it durable, abrasion-resistant and long-wearing.

4. A flexible magnetic recording element comprising:
   a flexible substrate;
   a magnetic recording layer disposed on said substrate, said magnetic recording layer comprising magnetic particles dispersed in a polymeric binder; and
   a smooth uniform transparent lubricative and protective coating which overlies said magnetic recording layer and extends into the topographical irregularities thereof, said coating having been formed by a process comprising the steps of:
   applying to said magnetic recording layer a coating of a dispersion which consists of particles of a telomer of tetrafluoroethylene dispersed in a liquid medium,
   effecting removal of said liquid medium from said coating to thereby leave said telomer on the surface of said magnetic recording layer in the form of an opaque particulate film; and
   calendering said element at a pressure of at least about 150 pounds per linear inch to form a smooth uniform transparent lubricative and protective coating consisting of said telomer which overlies said magnetic recording layer and extends into the topographical irregularities thereof to an extent sufficient to render it durable, abrasion-resistant and long-wearing.

5. A magnetic recording element as claimed in claim 4 wherein said substrate is a polyethylene terephthalate film.

6. A magnetic recording element as claimed in claim 4 wherein said magnetic recording layer comprises ferric oxide dispersed in a binder.

7. A magnetic recording element as claimed in claim 4 wherein said element is a floppy disk.

8. A magnetic recording element as claimed in claim 4 wherein said lubricative and protective coating has a thickness in the range of from about one to about three microinches.

9. A method for forming a lubricative and protective coating on a flexible magnetic recording element comprised of a flexible substrate and a magnetic recording layer disposed on said substrate, said magnetic recording layer comprising magnetic particles dispersed in a polymeric binder; which method comprises the steps of:
   applying to said magnetic recording layer a coating of a dispersion which consists of particles of a telomer of tetrafluoroethylene dispersed in a liquid medium;
   effecting removal of said liquid medium from said coating to thereby leave said telomer on the surface of said magnetic recording layer in the form of an opaque particulate film; and
   calendering said element at a pressure of at least about 150 pounds per linear inch to form a smooth uniform transparent lubricative and protective coating consisting of said telomer which overlies said magnetic recording layer and extends into the topographical irregularities thereof to an extent sufficient to render it durable, abrasion-resistant and long-wearing.

10. A method as claimed in claim 9 wherein said liquid medium is a halogenated hydrocarbon.

11. A method as claimed in claim 9 wherein said liquid medium is trichlorotrifluoroethane.

12. A method as claimed in claim 9 wherein said dispersion is sprayed on the surface of said magnetic recording layer.

13. A method as claimed in claim 9 wherein said magnetic recording element is dipped in said dispersion.

14. A method as claimed in claim 9 wherein removal of said liquid medium is effected by permitting it to evaporate.

15. A method as claimed in claim 9 wherein said substrate is a polyethylene terephthalate film.

16. A method as claimed in claim 9 wherein said magnetic recording layer comprises ferric oxide dispersed in a binder.

17. A method as claimed in claim 9 wherein said telomer particles have an average size of about five microns.

18. A method as claimed in claim 9 wherein said telomer has an average molecular weight of about 3700.

19. A method for forming a lubricative and protective coating on a flexible magnetic recording element comprised of a flexible substrate and a magnetic recording layer disposed on said substrate, said magnetic recording layer comprising magnetic particles dispersed in a polymeric binder; which method comprises the steps of:
   applying to said magnetic recording layer a coating of a dispersion which consists of particles of a telomer of tetrafluoroethylene dispersed in a liquid medium;
   effecting removal of said liquid medium from said coating to thereby leave said telomer on the surface of said magnetic recording layer in the form of an opaque particulate film,
   buffing said opaque particulate film to effect removal of excess telomer particles and to force telomer particles into said magnetic recording layer; and
   calendering said element at a pressure of at least about 150 pounds per linear inch to compress said magnetic recording layer and to further force telomer particles into said magnetic recording layer so as to form a smooth uniform transparent lubricative and protective coating consisting of said telomer which overlies said magnetic recording layer and extends into the topographical irregularities thereof to an extent sufficient to render it durable, abrasion-resistant and long-wearing.

20. A method as claimed in claim 19 wherein said buffing step is carried out with the use of a fibrous buffing material.

21. A method as claimed in claim 19 wherein said calendering step is carried out by means of a rotary drum type calendering apparatus.

22. A method as claimed in claim 19 wherein said calendering is carried out with a steel roll/compliant roll calender at a pressure in the range of from 300 to 670 pounds per linear inch.

23. A method as claimed in claim 19 wherein said calendering is carried out with the application of heat.

* * * * *